US012625103B2

(12) United States Patent
Nakamura

(10) Patent No.: US 12,625,103 B2
(45) Date of Patent: May 12, 2026

(54) VOID FRACTION SENSOR, FLOWMETER USING THE SAME, AND CRYOGENIC LIQUID TRANSFER PIPE

(71) Applicant: KYOCERA Corporation, Kyoto (JP)

(72) Inventor: Katsumi Nakamura, Koka (JP)

(73) Assignee: KYOCERA Corporation, Kyoto (JP)

( * ) Notice: Subject to any disclaimer, the term of this patent is extended or adjusted under 35 U.S.C. 154(b) by 412 days.

(21) Appl. No.: 18/266,229

(22) PCT Filed: Dec. 9, 2021

(86) PCT No.: PCT/JP2021/045383
§ 371 (c)(1),
(2) Date: Jun. 8, 2023

(87) PCT Pub. No.: WO2022/124377
PCT Pub. Date: Jun. 16, 2022

(65) Prior Publication Data
US 2024/0118232 A1     Apr. 11, 2024

(30) Foreign Application Priority Data
Dec. 9, 2020     (JP) ................................. 2020-204567

(51) Int. Cl.
*G01N 27/22*     (2006.01)
*G01F 1/74*     (2006.01)
(52) U.S. Cl.
CPC ............. *G01N 27/226* (2013.01); *G01F 1/74* (2013.01)
(58) Field of Classification Search
CPC ........ G01N 27/226; G01N 27/22; G01F 1/74; G01F 15/006; G01F 1/86
See application file for complete search history.

(56) References Cited

U.S. PATENT DOCUMENTS

2014/0203824 A1     7/2014 Nivet et al.
2018/0052133 A1*     2/2018 Godfrey ................. G01N 27/08

FOREIGN PATENT DOCUMENTS

CN          104965010 A     10/2015
CN          104965010 B  *   9/2018
(Continued)

OTHER PUBLICATIONS

Maeno et al., "Void Fraction Measurement of Cryogenic Two Phase Flow Using a Capacitance Sensor", Trans. JSASS Aerospace Tech. Japan vol. 12, No. ists29, pp. Pa_101-Pa_107, 2014.
(Continued)

*Primary Examiner* — Timothy P Graves
(74) *Attorney, Agent, or Firm* — Procopio, Cory, Hargreaves & Savitch LLP

(57)          ABSTRACT

A void fraction sensor according to the present disclosure includes an insulating inner pipe having a through hole through which a low-temperature liquid flows, at least a pair of electrodes mounted on an outer peripheral surface of the insulating inner pipe, and a heat insulating layer covering an outer peripheral side of the insulating inner pipe. A flowmeter according to the present disclosure measures a flow rate of a cryogenic liquid flowing through the through hole of the insulating inner pipe, and includes the void fraction sensor described above, and a flow velocity meter that measures a flow velocity of the cryogenic liquid flowing through the through hole.

16 Claims, 7 Drawing Sheets

(56) References Cited

FOREIGN PATENT DOCUMENTS

| | | | | | |
|---|---|---|---|---|---|
| DE | 3704410 | C2 | * | 12/1992 | .......... C04B 37/021 |
| JP | 72556/1979 | U | | 5/1979 | |
| JP | S54-147519 | A | | 11/1979 | |
| JP | S63-214620 | A | | 9/1988 | |
| JP | 1-93559 | U | | 6/1989 | |
| JP | H6-222030 | A | | 8/1994 | |
| JP | H6-241382 | A | | 8/1994 | |
| JP | H7-35670 | A | | 2/1995 | |
| JP | H11-153290 | A | | 6/1999 | |
| JP | 2005-235577 | A | | 9/2005 | |
| JP | 2014-115164 | A | | 6/2014 | |
| JP | 2014-524566 | A | | 9/2014 | |
| JP | 2014-232007 | A | | 12/2014 | |

OTHER PUBLICATIONS

Sakamoto et al., "Void fraction measurement in cryogenic flows. Part I: Design and validation of a void fraction capacitive sensor", Cryogenics 94 2018, pp. 36-44.
Filippov et al., "New solutions to produce a cryogenic void fraction sensor of round cross-section and its applications", Cryogenics 57 2013, pp. 55-62.

* cited by examiner

VOID FRACTION SENSOR, FLOWMETER USING THE SAME, AND CRYOGENIC LIQUID TRANSFER PIPE

TECHNICAL FIELD

The present disclosure relates to a void fraction sensor for measuring a void fraction of a cryogenic liquid such as liquid hydrogen, a flowmeter using the same, and a cryogenic liquid transfer pipe.

BACKGROUND OF INVENTION

With the recent trend of reducing greenhouse gas emissions, the use of hydrogen as a potent energy storage medium has been attracting attention. In particular, liquid hydrogen has a high volumetric efficiency and can be stored for a long period of time, and various techniques for utilizing liquid hydrogen have been developed. However, a method for accurately measuring the flow rate which is required in handling a large volume of liquid hydrogen for industrial use has not been established. A major reason for this is that liquid hydrogen is a fluid which is very easily vaporized and has a large fluctuation of gas-to-liquid ratio that fluctuates largely.

That is, liquid hydrogen is a liquid having an extremely low temperature (boiling point −253° C.) and having very high thermal conductivity and low latent heat, which causes immediate generation of voids. Therefore, in a transfer pipe, liquid hydrogen is in a so-called two-phase flow in which gas and liquid are mixed.

Because of the large fluctuation of the void content percentage, the flow rate of the liquid hydrogen cannot be accurately determined by only measuring the flow velocity in the pipe, as in ordinary liquids, when measuring the flow rate of the liquid hydrogen flowing in the pipe.

In view of the above, a void fraction meter that measures a void fraction indicating a gas phase volume percentage of the gas-liquid two phase flow is under development. As such a void fraction meter, Non-Patent Document 1 has proposed a capacitance type void fraction sensor that measures capacitance using a pair of electrodes.

CITATION LIST

Non-Patent Literature

Non-Patent Document 1: Norihide MAENO et al. (5), "Void Fraction Measurement of Cryogenic Two Phase Flow Using a Capacitance Sensor", Trans. JSASS Aerospace Tech. Japan, Vol. 12, No. ists29, pp. Pa_101-Pa_107, 2014

SUMMARY

Problem to be Solved

A void fraction sensor according to the present disclosure includes an insulating inner pipe having a through hole through which a cryogenic liquid flows, at least one pair of electrodes mounted on an outer peripheral surface of the insulating inner pipe, and a heat insulating layer covering an outer peripheral side of the insulating inner pipe.

A flowmeter according to the present disclosure measures a flow rate of a cryogenic liquid flowing through a through hole of an insulating inner pipe, and includes the void fraction sensor described above, and a flow velocity meter that measures the flow velocity of the cryogenic liquid flowing through the through hole.

The present disclosure also provides a cryogenic liquid transfer pipe provided with the flowmeter described above.

DESCRIPTION OF EMBODIMENTS

Hereinafter, a void fraction sensor according to an embodiment of the present disclosure will be described. A void fraction sensor that measures a void fraction when liquid hydrogen is used as a cryogenic liquid will be described.

Figure 1:
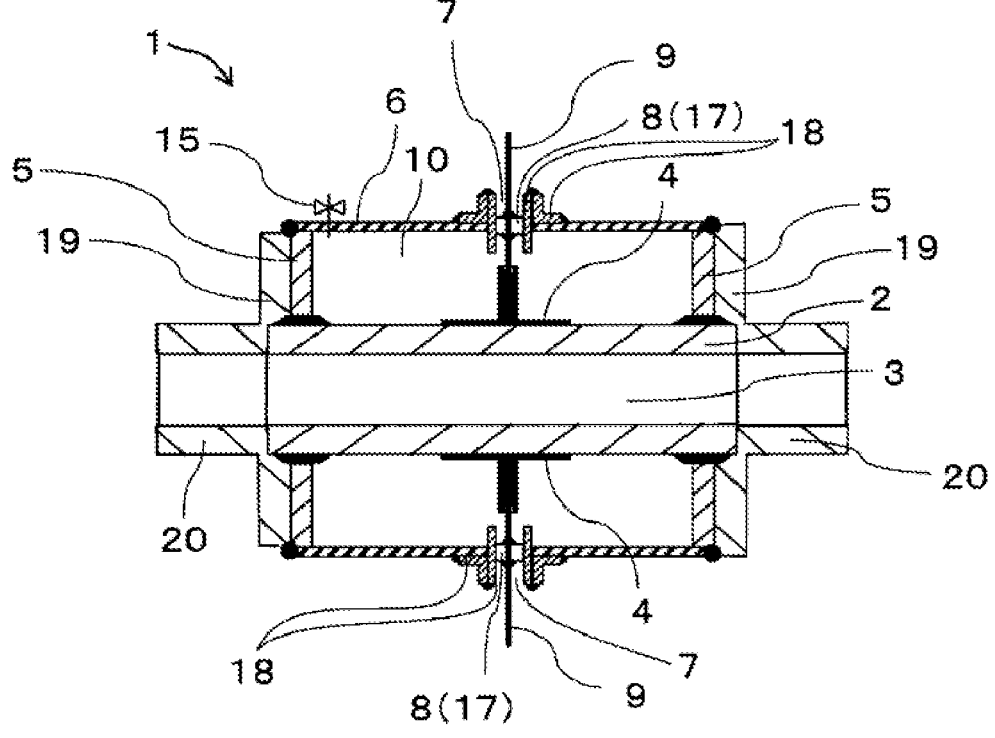
FIG. 1 is a schematic cross-sectional view illustrating a void fraction sensor according to an embodiment of the present disclosure.

FIG. 1 illustrates a void fraction sensor 1 according to an embodiment of the present disclosure. As illustrated in FIG. 1, a void fraction sensor 1 includes an insulating inner pipe 2 having a through hole 3 through which liquid hydrogen flows, and an even number (two in the present embodiment) of electrodes 4 mounted on an outer surface of the insulating inner pipe 2.

An annular portion 5 is attached to an outer peripheral portion at both ends of the insulating inner pipe 2, and an outer pipe 6 is bonded to an outer peripheral portion of the annular portion 5. The outer pipe 6 has a first insertion hole 7 which opens radially. A first hermetic terminal 8 is provided in the first insertion hole 7, and a conductive pin 9 connected to a respective one of the electrodes 4 is fixed in the first insertion hole 7.

The insulating inner pipe 2 is an inner pipe having a volume resistance value of at least $10^{10}$ Ω·m at 20° C.

The outer pipe 6 has a vacuum exhaust valve 15 (for example, a needle valve for vacuum exhaust) to form a vacuum space 10 (heat insulating layer) between the insulating inner pipe 2 and the outer pipe 6. Thus, the vacuum space 10 located on the outer peripheral side of the insulating inner pipe 2 as described above ensures heat insulating performance for the insulating inner pipe 2. As a result, this suppresses generation of voids due to the influence of the outside air temperature and improves the measurement accuracy of the void fraction. In other words, the generation of voids in the insulating inner pipe 2 caused by the effect of the outside temperature cannot be sufficiently controlled without sufficient heat insulating performance between the inside and outside of the insulating inner pipe 2 through which a cryogenic liquid such as liquid nitrogen flows. This makes it difficult to accurately measure the void fraction of the cryogenic liquid.

Since the first hermetic terminal 8 suppresses the leakage of the liquid hydrogen from the insulating inner pipe 2 to the outside, the measurement accuracy of the void fraction is further improved.

The insulating inner pipe 2 is preferably made of a ceramic such as a ceramic containing aluminum oxide as a main constituent. When aluminum oxide is the main constituent, the insulating inner pipe 2 can have excellent mechanical properties while having a relatively low raw material price and relatively low manufacturing costs.

The insulating inner pipe 2 made of a ceramic containing aluminum oxide as a main constituent may contain, for example, silicon, magnesium, and calcium. For example, when these elements are converted into oxides, $SiO_2$ accounts for 0.3 mass % to 1 mass %, MgO accounts for 0.1 mass % to 0.4 mass %, and CaO accounts for 0.04 mass % to 0.08 mass % out of a total of 100 mass % of the constituents constituting the ceramic.

Anorthite ($CaAl_2Si_2O_8$) may be included. Since anorthite has a smaller coefficient of linear expansion than aluminum oxide, the inclusion of anorthite can improve thermal shock resistance. In particular, the insulating inner pipe 2 is preferably made of a low thermal expansion ceramic. The low thermal expansion ceramic refers to a ceramic having a coefficient of linear expansion of 0±20 ppb/K or less at 22° C. The low thermal expansion ceramic having a low coefficient of linear expansion reduces the risk of breakage of the low thermal expansion ceramic when it is subjected to a thermal shock caused by a cryogenic liquid including liquid hydrogen.

Specifically, the low thermal expansion ceramic preferably contains cordierite as a main crystal phase, and alumina, mullite, and sapphirine as sub-crystal phases, while an amorphous phase containing Ca is present as a grain boundary phase. The crystal phase ratio of the main crystal phase accounts for 95 mass % to 97.5 mass %, the crystal phase ratio of the sub-crystal phase accounts for 2.5 mass % to 5 mass %, the Ca content in the total amount is from 0.4 mass % to 0.6 mass % in terms of CaO. In addition, zirconia is included, with the content of zirconia in the total amount being preferably from 0.1 mass % to 1.0 mass %. The relative permittivity of the ceramic constituting the insulating inner pipe 2 becomes close to that of the cryogenic liquid, which improves a high frequency characteristic, allowing further improvement of the measuring accuracy of the void fraction.

The crystal phase and its ratio in the low thermal expansion ceramic can be analyzed by the Rietveld method with an X-ray diffraction apparatus using CuKα beams for the analysis target range of diffraction angle 2θ=8 to 100 degrees.

The insulating inner pipe 2 may be made of, for example, a ceramic containing silicon nitride or sialon as a main constituent. Having a high mechanical strength and a thermal shock resistance, these ceramics are less likely to break even when they are subjected to thermal shock.

Specifically, these ceramics contain calcium oxide, aluminum oxide, and an oxide of a rare earth element. The content of calcium oxide and aluminum oxide is from 0.3 mass % to 1.5 mass % and 14.2 mass % to 48.8 mass %, respectively, out of the total of 100 mass % of calcium oxide, aluminum oxide, and the oxide of the rare earth element. The remainder is the oxide of the rare earth element. The silicon nitride is β-sialon represented by a composition formula $Si_{6-z}Al_zO_zN_{8-z}$ (z=0.1 to 1) and has an average crystal grain size of 20 μm or less (excluding 0 μm).

The main constituent of a ceramic refers to a constituent accounting for at least 60 mass % out of 100 mass % of all constituents constituting the ceramic. In particular, the main constituent may preferably be a constituent that accounts for at least 95 mass % out of 100 mass % of the constituents constituting the ceramic. The constituents constituting the ceramic may be obtained by using an X-ray diffractometer (XRD). For the content of each constituent, after the constituent is identified, the content of elements constituting the constituent is determined using a fluorescence X-ray analyzer (XRF) or an ICP emission spectrophotometer, and may be converted into the identified constituent.

The relative density of a ceramic is, for example, from 92% to 99.9%. The relative density, relative to the theoretical density of a ceramic, is expressed as a percentage (ratio) of the apparent density of a ceramic which is determined in accordance with JIS R 1634-1998.

The ceramic includes closed pores, and a value obtained by subtracting an average equivalent circle diameter of the closed pores from an average distance between the centers of gravity of adjacent closed pores may be from 8 μm to 18 μm (this value will hereinafter be referred to as the distance between the closed pores). The closed pores are independent of each other.

When the interval between the closed pores is 8 μm or greater, the closed pores are present in a relatively dispersed manner which increases mechanical strength. When the interval between the closed pores is 18 μm or less, even if a microcrack originating from the contour of a closed pore occurs due to repeated cold thermal shocks, the likelihood of the extension of the microcrack being blocked is high due to the surrounding closed pores. This means that the insulating inner pipe 2 made of the ceramic having the interval between the closed pores from 8 μm to 18 μm can be used over a long period of time.

The skewness of the equivalent circle diameter of the closed pores may be larger than the skewness of the distance between the centers of gravity of the closed pores. The skewness is an index (a statistic) indicating how much a distribution is distorted from the normal distribution. That is, the skewness indicates the bilateral symmetry of the distribution. When the skewness is greater than 0, the tail of the distribution extends to the right. When the skewness is 0, the distribution is bilaterally symmetrical. When the skewness is less than 0, the tail of the distribution extends to the left.

Overlapping histograms of the equivalent circle diameter and the distance between the centers of gravity of the closed pores indicates that the mode value of the equivalent circle diameter is located on the left side (zero side) of the mode value of the distance between the centers of gravity of the closed pores, when the skewness of the equivalent circle diameter is larger than the skewness of the distance between the centers of gravity. This means that many closed pores with small equivalent circle diameters are present and such closed pores are present sparsely, such that the insulating inner pipe 2 having both mechanical strength and thermal shock resistance can be obtained.

For example, the skewness of the equivalent circle diameter of the closed pores is 1 or greater, and the skewness of the distance between the centers of gravity of the closed pores is 0.6 or less. The difference between the skewness of the equivalent circle diameter of the closed pores and the skewness of the distance between the centers of gravity of the closed pores is 0.4 or greater.

To determine the distance between the centers of gravity and the equivalent circle diameter of the closed pores, the ceramic member is first polished on a copper disc using diamond abrasive grains having an average grain diameter $D_{50}$ of 3 μm from one end surface of the ceramic member along the axial direction. Subsequently, polishing is then performed on a tin disc using diamond abrasive grains having an average grain diameter $D_{50}$ of 0.5 μm to obtain a polished surface having an arithmetic mean roughness Ra of 0.2 μm or less in the roughness curve.

The arithmetic mean roughness Ra of the polished surface is the same as that in the method described above.

The polished surface is observed at 200× magnification and, with an average area selected, an area of, for example, $7.2×10^4$ μm$^2$ (horizontal length 310 μm by vertical length 233 μm) is captured with a CCD camera to obtain an observation image.

The distance between the centers of gravity of the closed pores can be determined for this observation image, for example, with the image analysis software "A zou-kun (ver 2.52)" (trade name of Asahi Kasei Engineering Corporation), using the method called a distance between centers of gravity method for dispersion measurement. Hereinafter, the term image analysis software "A zou-kun" refers to the image analysis software manufactured by Asahi Kasei Engineering Corporation throughout the description.

For example, the setting conditions for this method can be as follows: the threshold is 165 which is used as a measure of the brightness/darkness, the brightness level is set to dark, the small figure removal area is 1 μm$^2$, and no noise reduction filter is set. The threshold can be adjusted according to the brightness of the observation image. The brightness level is set to dark, the binarization method is set to manual, the small figure removal area is set to 1 μm$^2$, and the noise removal filter is set. Then, the threshold can be adjusted so that a marker appearing in the observation image matches the shape of the closed pore. For the equivalent circle diameter of the closed pores, a particle analysis method is used to determine the equivalent circle diameter of the open pores by using the observation image as a target. The setting conditions for this method may be the same as the setting conditions for calculating the distance between the centers of gravity of the closed pores. The skewness of the equivalent circle diameter and the distance between the centers of gravity of the closed pores can be calculated using the Skew function provided in Excel (trade name of Microsoft Corporation).

An example of a method for manufacturing the inner pipe made of such a ceramic is described. The inner pipe made of a ceramic containing aluminum oxide as the main constituent is described.

The main constituent of aluminum oxide powder (purity of at least 99.9 mass %) is put into a pulverizing mill with powders of magnesium hydroxide, silicon oxide, and calcium carbonate, and a solvent (for example, ion-exchanged water). The mixture is pulverized until an average grain diameter ($D_{50}$) of the powders is 1.5 μm or less. Subsequently, an organic binder and a dispersing agent for dispersing the aluminum oxide powder are added and mixed to obtain a slurry.

Of the total of 100 mass % of the powders described above, the content of magnesium hydroxide powder is from 0.3 to 0.42 mass %, the content of silicon oxide powder is from 0.5 to 0.8 mass %, the content of calcium carbonate powder is from 0.06 to 0.1 mass %, and the remainder includes aluminum oxide powder and incidental impurities. The organic binder is, for example, an acrylic emulsion, polyvinyl alcohol, polyethylene glycol, polyethylene oxide, or the like.

Subsequently, the slurry is spray-granulated to obtain granules which are then pressurized at a molding pressure from 78 MPa to 118 MPa using a uniaxial press molding device or a cold isostatic press molding device to obtain a columnar powder compact. The powder compact is cut, if necessary, to form a recess which becomes a recessed portion after firing.

Subsequently, the powder compact is burned at a firing temperature of 1580° C. to 1780° C. and the retention time of 2 hours to 4 hours to obtain a ceramic inner pipe. To obtain a ceramic having an interval between the closed pores of from 8 μm to 18 μm, the firing temperature is set to 1600° C. to 1760° C. and the retention time is set to 2 hours to 4 hours to fire the powder compact. The surface of the ceramic member facing the conduit may be ground to form a ground surface. A surface of the recessed portion on which the electrode is provided may be ground to form a bottom surface. The inner diameter of the insulating inner pipe 2 is preferably at least 50 mm.

The annular portion 5 is preferably made of an alloy such as a Fernico alloy, an Fe—Ni alloy, an Fe—Ni—Cr—Ti—Al alloy, an Fe—Cr—Al alloy, an Fe—Co—Cr alloy, an Fe—Co alloy, an Fe—Co—C alloy, or an austenitic stainless steel having a nickel content of at least 10.4 mass %. To ensure sufficient heat insulating performance, the outer diameter of the annular portion 5 is at least 1 mm, preferably at least 10 mm, with respect to the outer diameter of the insulating inner pipe 2, and is 200 mm or less, preferably 100 mm or less, with respect to the outer diameter of the insulating inner pipe 2. The annular portion 5 is hermetically bonded to the outer peripheral surface of the metallized insulating inner pipe 2 by brazing.

The outer pipe 6 is preferably made of a metal such as an austenitic stainless steel (for example, SUS316L) having a nickel content of at least 10.4 mass %, or a ceramic such as silicon nitride, sialon, or the like.

The first hermetic terminal 8 constitutes a so-called hermetic connector, and includes the conductive pin 9, a first ceramic substrate 17 having a disk shape and a first pin hole (not illustrated) in a thickness direction in which the conductive pin 9 is to be inserted, and a first annular body 18 surrounding the outer peripheral surface of the first ceramic substrate 17. The first annular body 18 functions as a sleeve for holding the first ceramic substrate 17, and is preferably made of, for example, a Fernico alloy, an Fe—Ni alloy, an Fe—Ni—Cr—Ti—Al alloy, an Fe—Cr—Al alloy, an Fe—Co—Cr alloy, an Fe—Co alloy, an Fe—Co—C alloy, or an austenitic stainless steel having a nickel content of at least 10.4 mass %. This suppresses occurrence of embrittlement caused by liquid hydrogen and keeps the measurement accuracy of the void fraction over a long period of time.

Examples of the austenitic stainless steel having a nickel content of at least 10.4 mass % include SUS310S, SUS316L, SUS316LN, SUS316J1L, and SUS317L.

The electrodes 4 can be made of, for example, copper foil, aluminum foil, or the like. The electrodes 4 can be provided on the outer peripheral surface of the insulating inner pipe 2 by, for example, vacuum evaporation, metallization, or using an active metal method. Alternatively, a metal plate serving as an electrode 29 may be bonded to the bottom surface of a recessed portion 28 which will be described later. The thicknesses of electrodes 4 are at least 10 μm, preferably at least 20 μm, and 2 mm or less, preferably 1 mm or less.

A metal pipe 20 having a flange 19 is disposed at both ends of the insulating inner pipe 2 to which the annular portion 5 and the flange 19 are welded or brazed. Connecting the metal pipe 20 to the insulating inner pipe 2 as such can reduce the likelihood of breakage due to external shocks, and the welding or brazing of the annular portion 5 to the flange 19 suppresses leakage of liquid hydrogen from the insulating inner pipe 2 to the outside, leading to further improvement of the measurement accuracy of the void fraction. The metal pipe 20 may be a liquid hydrogen transfer pipe for transferring liquid hydrogen.

Another embodiment of the present disclosure will be described with reference to FIGS. 2, 3A and 3B. A void fraction sensor 11 according to the present embodiment has a structure in which an insulating inner pipe 21 is surrounded by a housing 22 and the outside of the housing 22 is covered with an outer pipe 26. The housing 22 has a second insertion hole 23 which is open radially on the outer peripheral surface, and also has a connection hole 24 which is open along the axial direction of the insulating inner pipe 21 and communicates with the through hole 31 of the insulating inner pipe 21. A metal pipe 25 communicating with the through hole 31 of the insulating inner pipe 21 via the connection hole 24 is disposed at both ends of the housing 22.

23 Second insertion hole
    24 Connection hole
    26, 26' Outer pipe
    27 First insertion hole
    28 Recessed portion
    29 Electrode
    30 Binding body
    50' Second ceramic substrate
    51 Annular portion
    52' Second annular body The insulating inner pipe 21 has a recessed portion 28 which is open toward the outside, and an electrode 29 is mounted on the bottom surface of the recessed portion 28. As illustrated in FIGS. 3A and 3B, the insulating inner pipe 21 is composed of an even number (four in the present embodiment) of dividable ceramic members 21a, 21b, 21c and 21d arranged in a circumferential direction.

In order to assemble the insulating inner pipe 21 with these ceramic members 21a to 21d, the side surfaces thereof are overlapped with each other, and an annular binding body 30 is mounted over the outer peripheral surface to bind the ceramic members 21a to 21d to form the insulating inner pipe 21. In this state, the housing 22 is attached to the outer peripheral side of the insulating inner pipe 21. In other words, the housing 22 is provided to accommodate the dividable insulating inner pipe 21.

That is, the housing 22 includes a frame body 22a accommodating the insulating inner pipe 21 and a cover portion 22b that seals the opening of the frame body 22a. After the bound ceramic members 21a to 21d are accommodated in the frame body 22a, the frame body 22a and the cover portion 22b are bonded to each other by welding or brazing. The frame body 22a and the cover portion 22b each have an opening communicating with the through hole of the insulating inner pipe 21, and the metal pipe 25 is welded or brazed to the frame body 22a and the cover portion 22b so as to communicate with the through hole via each opening.

Figure 3A:
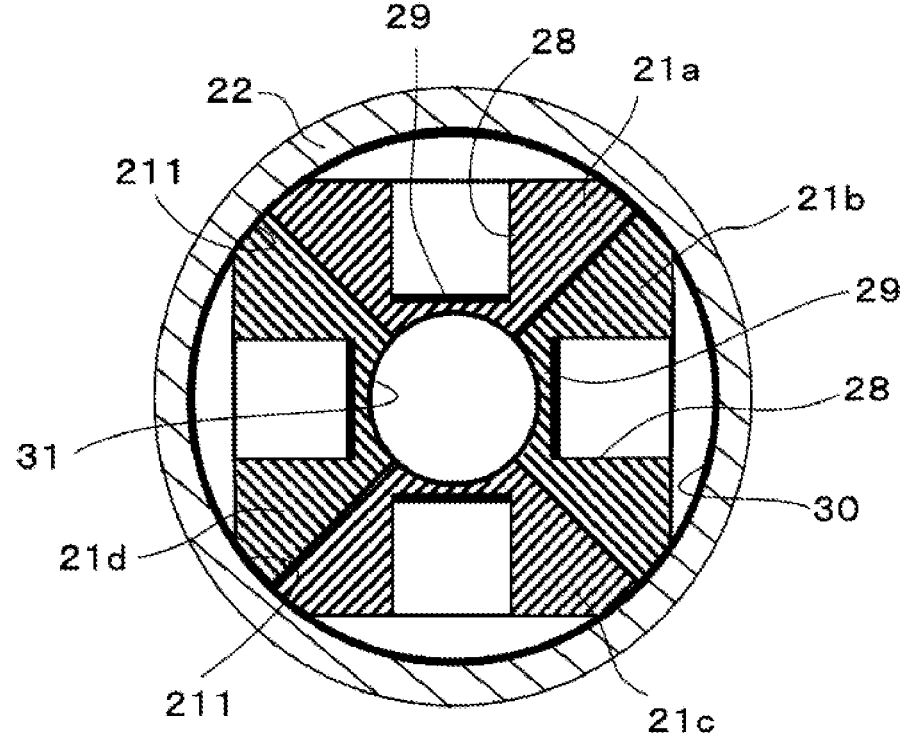
FIG. 3A is a cross-sectional view illustrating an assembly structure of the insulating inner pipe illustrated in FIG. 2.
Figure 3B:
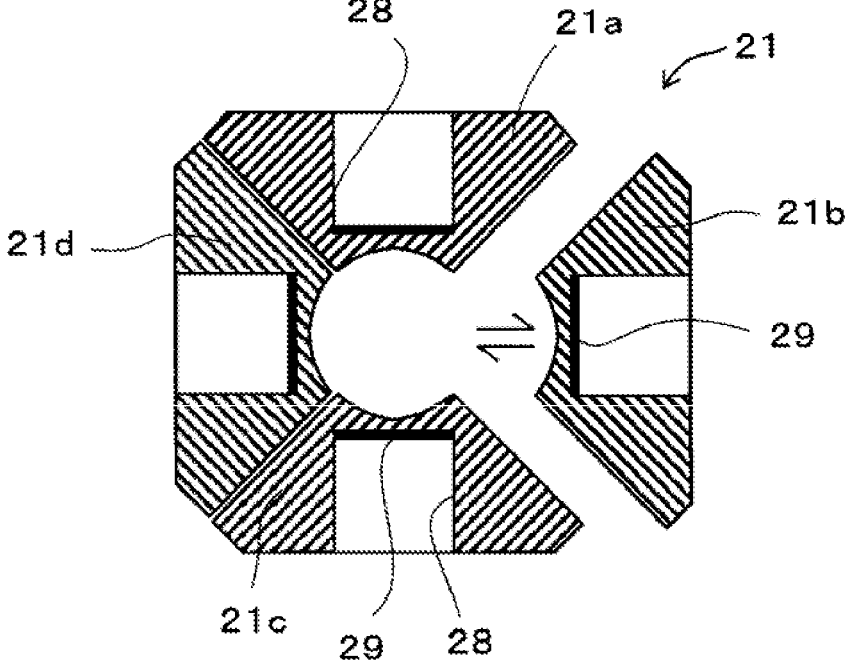
FIG. 3B is an explanatory view illustrating dividable ceramic members illustrated in FIG. 3A.

As illustrated in FIGS. 3A and 3B, the insulating inner pipe 21 has a substantially quadrangular cross section, and corner portions 211 thereof are chamfered or rounded. Therefore, the chamfered corner portions 211 are press-bonded by the annular binding body 30 to tightly bind the ceramic members 21a to 21d. Examples of the binding body 30 include a strip-shaped flexible plastic film, and a metal strip. At this time, both ends of the binding body 30 are bonded by bonding means such as thermal fusion or welding.

Like the insulating inner pipe 2, the ceramic members 21a to 21d constituting the insulating inner pipe 21 are preferably made of a low thermal expansion ceramic or a ceramic containing aluminum oxide, silicon nitride, or sialon as a main constituent.

At least one of the ceramic members 21a to 21d may have closed pores, and the interval between the closed pores may be from 8 $\mu$m to 18 $\mu$m.

Referring to FIG. 2 again, an annular portion 51 is located on the outer side of the housing 22 in the axial direction. The annular portion 51 has an axial hole coaxial with the insulating inner pipe 21, and is welded or brazed to the outer peripheral surface of the metal pipe 25 inserted through the axial hole. The outer pipe 26 is bonded to an outer peripheral portion of the annular portion 51. The outer pipe 26 has a first insertion hole 27 which opens radially on the outer peripheral surface.

In the first insertion hole 27, a first hermetic terminal 81 for fixing a conductive pin 91 which is connected to the electrode 29 is provided. Like the first hermetic terminal 8, the first hermetic terminal 81 includes a conductive pin 91, a first ceramic substrate 50 having a disk shape and a first pin hole (not illustrated) in the thickness direction in which the conductive pin 91 is to be inserted, and a first annular body 52 surrounding the outer peripheral surface of the first ceramic substrate 50.

Similarly, a second hermetic terminal 82 for fixing the conductive pin 91 in the second insertion hole 23 is also provided in a second insertion hole 23 on the outer peripheral surface of the housing 22. The second hermetic terminal 82 includes the conductive pin 91, a second ceramic substrate 50' having a disk shape and a second pin hole (not illustrated) in the thickness direction in which the conductive pin 91 is to be inserted, and a second annular body 52' surrounding the outer peripheral surface of the second ceramic substrate 50'.

The outer pipe 26 has a vacuum exhaust valve 15 (for example, a vacuum exhaust needle valve) to form a vacuum space 100 (heat insulating layer) between the housing 22 and the outer pipe 26. At this time, the space between the insulating inner pipe 21 and the housing 22 may also be a vacuum space. The vacuum space 100 located between the housing 22 and the outer pipe 26 as described above suppresses vaporization of the liquid hydrogen due to the outside air temperature, improves heat insulating performance with respect to the insulating inner pipe 21, suppressing generation of voids, and improves the measurement accuracy of the void fraction. Other portions are the same as those of the embodiment illustrated in FIG. 1, and detailed description thereof will be omitted.

Figure 2:
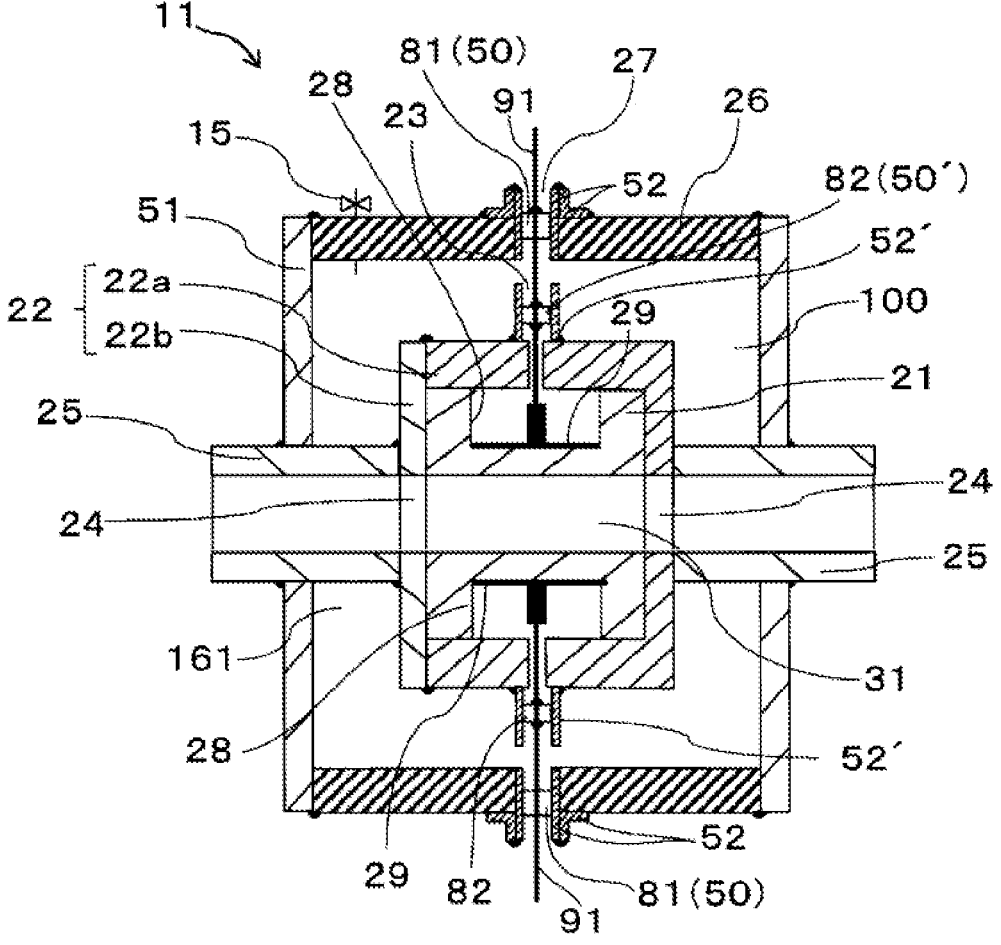
FIG. 2 is a schematic cross-sectional view illustrating a void fraction sensor according to another embodiment of the present disclosure.
Figure 4:
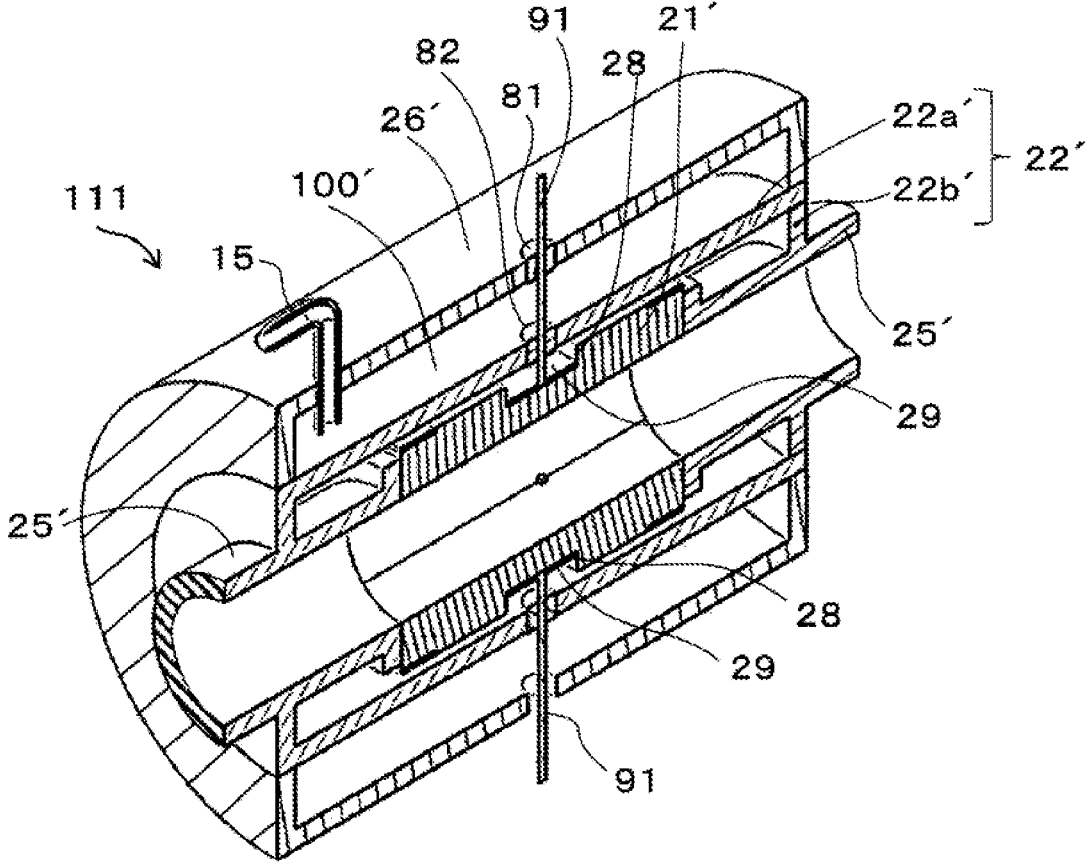
FIG. 4 is a partially cutaway perspective view of a variation of the void fraction sensor illustrated in FIG. 2.
Figure 5:
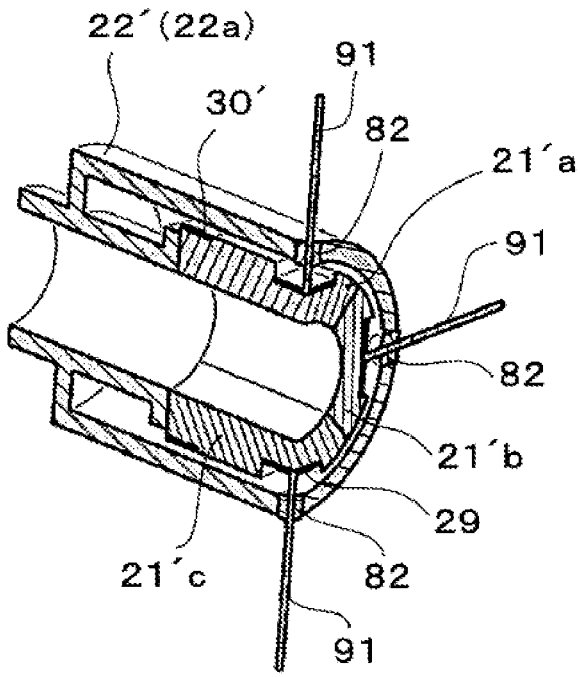
FIG. 5 is a partially cutaway perspective view of the insulating inner pipe and its surrounding structure illustrated in FIG. 4.
Figure 6:
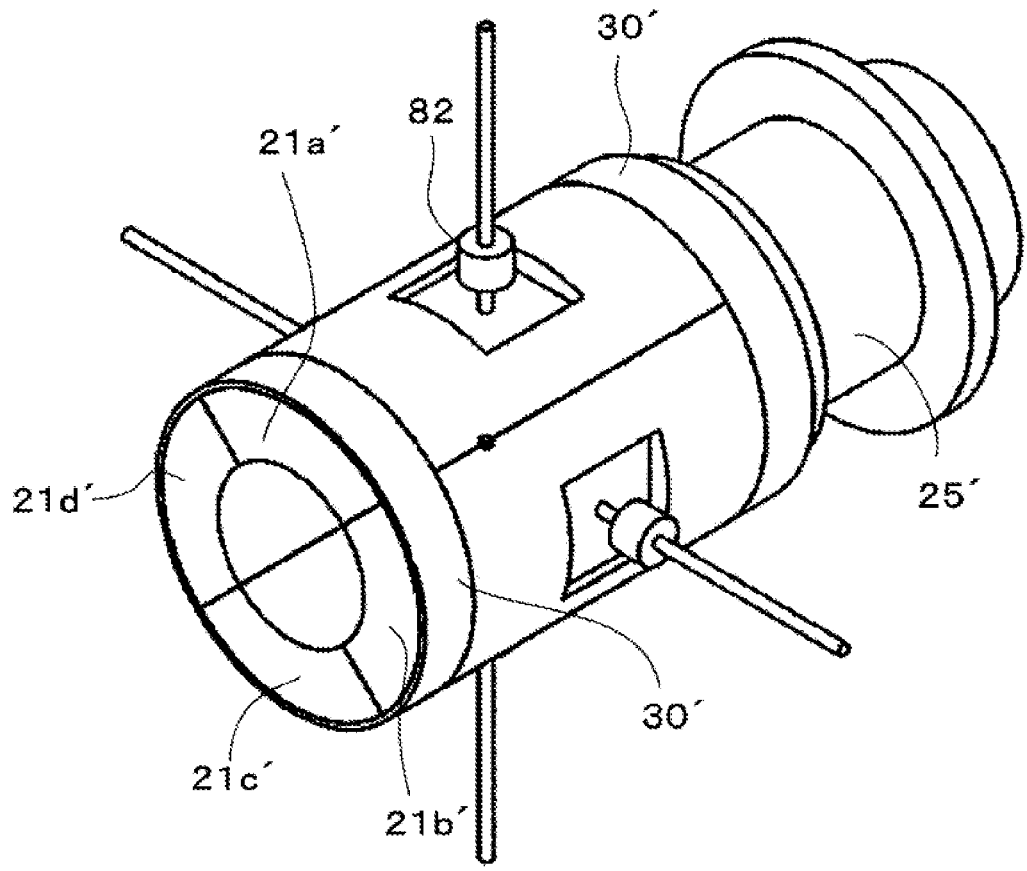
FIG. 6 is a perspective view of the insulating inner pipe illustrated in FIG. 4.

A variation of the embodiment illustrated in FIGS. 2, 3A, and 3B is illustrated in FIGS. 4 to 6. The same constituent members as those of the void fraction sensor 11 illustrated in FIGS. 2, 3A and 3B are denoted by the same reference signs, and descriptions thereof will be omitted.

A void fraction sensor 111 of this variation illustrated in FIG. 4 includes a metal pipe 25' directly bonded to an insulating inner pipe 21'. A frame body 22a' and a cover portion 22b' constituting a housing 22' are formed integrally with the metal pipe 25' or bonded to the metal pipe 25'. An outer pipe 26' is bonded to the outer peripheral surface of the housing 22'. It is bonded by, for example, welding, brazing, or the like.

The outer pipe 26' includes a vacuum exhaust valve 15, and a vacuum space 100' (heat insulating layer) is formed between the insulating inner pipe 21' and the outer pipe 26'.

As illustrated in FIGS. 5 and 6, the insulating inner pipe 21' is composed of four ceramic members 21a', 21b', 21c', and 21d' which are bonded together with a binding body 30'. Details are illustrated in FIGS. 3A and 3B.

In the present disclosure, the cross section of the inner pipe is not limited to a substantially quadrangular shape, and the cross-sectional shape may be a circular shape or another polygonal shape. In that case, an even number of, for example, two, four, six, or eight ceramic members are provided to constitute the inner pipe. This is because at least a pair of opposing electrodes is required to measure the capacitance, and each electrode is attached to a respective ceramic member.

Since the capacitance is measured between the opposing electrodes, the electrodes need not be provided on all of the even number of ceramic members, and may be provided only on each of the at least one pair of opposing ceramic members.

The flowmeter according to the embodiments of the present disclosure is described. The flowmeter measures the flow rate of the liquid hydrogen flowing in the insulating inner pipe 2, 21, or 21', and includes the void fraction sensor 1, 11, or 111 described above, and a flow velocity meter (not illustrated) that measures the flow velocity of the cryogenic liquid flowing through the through hole 3 or 31. The void fraction sensor 1, 11, or 111 and the flow velocity meter are attached to a liquid hydrogen transfer pipe which is not illustrated (hereinafter may be referred to as a transfer pipe).

Since the liquid hydrogen flowing through the through hole 3 or 31 is a two-phase flow mixing gas and liquid, the void fraction sensor 1, 11, or 111 measures the capacitance of the liquid hydrogen, from which a density d $(kg/]m^3)$ of the liquid hydrogen is obtained.

Accordingly, a flow rate F (kg/s) is determined by the following equation, where v is the flow velocity (m/s) of the liquid hydrogen determined by the flow velocity meter, and a is the cross-sectional area $(m^2)$ of the through hole 3, or 31'.

$$F = d \times v \times a$$

To calculate this equation, the flowmeter further includes a calculator to which the void fraction sensor 1, 11, or 111 and the flow velocity meter are connected. This facilitates the measurement of the flow rate of the liquid hydrogen, leading to easier control when transferring a large amount of liquid hydrogen for industrial use.

The void fraction sensors 1, 11, and 111 for liquid hydrogen and the flowmeter using the same have been described above; however, the present disclosure can be similarly applied to other cryogenic liquids, such as liquid nitrogen (−196° C.), liquid helium (−269° C.), liquefied natural gas (−162° C.), liquid argon (−186° C.) and the like (where the values in parentheses indicate the liquefaction temperature). Therefore, the cryogenic liquid in the present disclosure is a liquid that is liquefied at a cryogenic temperature of −162° C. or lower.

Although the preferred embodiments of the present disclosure have been described above, the void fraction sensor of the present disclosure is not limited thereto, and many changes and improvements can be made within the range set forth in the present disclosure.

REFERENCE SIGNS

1, 11, 111 Void fraction sensor
2, 21, 21' Insulating inner pipe

21a, 21b, 21c, 21d Ceramic member
21a', 21b', 21c', 21d' Ceramic member
211 Corner portion
3, 31 Through hole
4, 29 Electrode
5 Annular portion
6 Outer pipe
7 First insertion hole
8, 81 First hermetic terminal
82 Second hermetic terminal
9, 91 Conductive pin
10, 100, 100' Vacuum space
15 Vacuum exhaust valve
17, 50 First ceramic substrate
18, 52 First annular body
19 Flange
20, 25, 25' Metal pipe
22, 22' Housing
22a, 22a' Frame body
22b, 22b' Cover portion
23 Second insertion hole
24 Connection hole
26, 26' Outer pipe
27 First insertion hole
28 Recessed portion
29 Electrode
30 Binding body
50' Second ceramic substrate
51 Annular portion
52' Second annular body

The invention claimed is:

1. A void fraction sensor, comprising:
an insulating inner pipe having a through hole through which a cryogenic liquid flows;
at least one pair of electrodes mounted on an outer surface of the insulating inner pipe; and
a heat insulating layer covering an outer peripheral side of the insulating inner pipe, wherein
the void fraction sensor further comprises:
an annular portion provided at both ends of the insulating inner pipe;
an outer pipe bonded to an outer peripheral portion of the annular portion and having a first insertion hole; and
a first hermetic terminal provided in the first insertion hole and in which a conductive pin is fixed, the conductive pin connected to a corresponding electrode of the at least one pair of electrodes, in the first insertion hole, wherein
the heat insulating layer is a vacuum space located between the insulating inner pipe and the outer pipe, wherein
the first hermetic terminal comprises
the conductive pin,
a ceramic substrate having a disk shape and a first pin hole in a thickness direction in which the conductive pin is inserted, and
an annular body surrounding an outer peripheral surface of the ceramic substrate, and
the annular body is made of a Fernico alloy, an Fe—Ni alloy, an Fe—Ni—Cr—Ti—Al alloy, an Fe—Cr—Al alloy, an Fe—Co—Cr alloy, an Fe—Co alloy, an Fe—Co—C alloy, or an austenitic stainless steel having a nickel content of at least 10.4 mass %.

2. The void fraction sensor according to claim 1, wherein
the insulating inner pipe comprises a metal pipe having a
flange at at least one end of the insulating inner pipe,
and
the annular portion and the flange are welded or brazed
together.

3. The void fraction sensor according to claim 1, wherein
the insulating inner pipe is made of a low thermal expan-
sion ceramic.

4. A flowmeter for measuring a flow rate of a cryogenic
liquid flowing through a through hole of an inner pipe,
comprising:
the void fraction sensor according to claim 3; and
a flow velocity meter that measures a flow velocity of the
cryogenic liquid flowing through the through hole.

5. A cryogenic liquid transfer pipe comprising:
the flowmeter according to claim 4.

6. A void fraction sensor, comprising:
an insulating inner pipe having a through hole through
which a cryogenic liquid flows;
at least one pair of electrodes mounted on an outer surface
of the insulating inner pipe; and
a heat insulating layer covering an outer peripheral side of
the insulating inner pipe, wherein
the insulating inner pipe is composed of an even number
of dividable ceramic members arranged in a circum-
ferential direction, and
the void fraction sensor further comprises:
a housing surrounding the insulating inner pipe and
having a second insertion hole and a connection hole
communicating with the through hole of the insulat-
ing inner pipe;
an annular portion located outside of the housing and
having an axial hole coaxial with the insulating inner
pipe;
an outer pipe bonded to an outer peripheral portion of
the annular portion and having a first insertion hole;
a first hermetic terminal fixing a conductive pin in the
first insertion hole, the conduct pin connected to a
corresponding electrode of the at least one pair of
electrodes; and
a second hermetic terminal fixing the conductive pin in
the second insertion hole, and
a vacuum space is located at least between the outer
pipe and the housing.

7. The void fraction sensor according to claim 6, wherein
the first hermetic terminal and the second hermetic ter-
minal each comprise the conductive pin, a ceramic
substrate having a disk shape and a pin hole in a
thickness direction in which the conductive pin is
inserted, and an annular body surrounding an outer
peripheral surface of the ceramic substrate, and the annular body is made of a Fernico alloy, an Fe—Ni
alloy, an Fe—Ni—Cr—Ti—Al alloy, an Fe—Cr—Al
alloy, an Fe—Co—Cr alloy, an Fe—Co alloy, an Fe—
Co—C alloy, or an austenitic stainless steel having a
nickel content of at least 10.4 mass %.

8. The void fraction sensor according to claim 6, wherein
the insulating inner pipe has a recessed portion which is
open toward the outside of the housing, and each
electrode of the at least one pair of electrodes is
mounted on a bottom surface of the recessed portion.

9. The void fraction sensor according to claim 6, wherein
electrodes of the at least one pair of electrodes are
individually mounted on each of at least the pair of
opposing ceramic members among the even number of
ceramic members.

10. The void fraction sensor according to claim 6, wherein
the dividable ceramic members are bound by an annular
binding body mounted on an outer peripheral side of
the insulating inner pipe.

11. The void fraction sensor according to claim 6, wherein
an end surface and/or an outer side surface of the insu-
lating inner pipe is in contact with an inner surface of
the housing.

12. The void fraction sensor according to claim 6, wherein
the housing comprises
a frame body accommodating the insulating inner pipe,
and
a cover portion sealing an opening of the frame body,
an opening of the frame body and an opening of the cover
portion each communicate with the through hole of the
insulating inner pipe, and
a metal pipe is welded or brazed to the frame body and the
cover portion to communicate with the through hole via
the opening of the frame body and the opening of the
cover portion.

13. The void fraction sensor according to claim 12,
wherein
the annular portion is welded or brazed to the metal pipe.

14. The void fraction sensor according to claim 6, wherein
the insulating inner pipe is made of a low thermal expan-
sion ceramic.

15. A flowmeter for measuring a flow rate of a cryogenic
liquid flowing through a through hole of an inner pipe,
comprising:
the void fraction sensor according to claim 6; and
a flow velocity meter that measures a flow velocity of the
cryogenic liquid flowing through the through hole.

16. A cryogenic liquid transfer pipe comprising:
the flowmeter according to claim 15.

* * * * *